United States Patent
Hayman et al.

(10) Patent No.: US 11,087,309 B2
(45) Date of Patent: Aug. 10, 2021

(54) LOCATION DETECTION BASED ON IP ADDRESSES AND TRANSACTIONS

(71) Applicants: Liron Hayman, Hod Hasharon (IL); Shimon Shahar, Hod Hasharon (IL)

(72) Inventors: Liron Hayman, Hod Hasharon (IL); Shimon Shahar, Hod Hasharon (IL)

(73) Assignee: Intuit Inc., Mountain View, CA (US)

( * ) Notice: Subject to any disclaimer, the term of this patent is extended or adjusted under 35 U.S.C. 154(b) by 91 days.

(21) Appl. No.: 16/114,435

(22) Filed: Aug. 28, 2018

(65) Prior Publication Data

US 2020/0074439 A1    Mar. 5, 2020

(51) Int. Cl.
| | | |
|---|---|---|
| G06Q 20/32 | (2012.01) |
| H04L 12/26 | (2006.01) |
| H04W 8/26 | (2009.01) |
| H04L 29/06 | (2006.01) |
| H04L 29/12 | (2006.01) |

(52) U.S. Cl.
CPC ....... *G06Q 20/3224* (2013.01); *H04L 43/106* (2013.01); *H04L 69/28* (2013.01); *H04W 8/26* (2013.01); *H04L 61/2007* (2013.01); *H04L 69/16* (2013.01)

(58) Field of Classification Search
CPC ... G06Q 20/3224; H04L 43/106; H04L 69/28; H04L 61/2007; H04L 69/16; H04W 8/26
See application file for complete search history.

(56) References Cited

U.S. PATENT DOCUMENTS

| | | | | |
|---|---|---|---|---|
| 8,621,064 B2* | 12/2013 | Campbell | ............... | H04L 67/18 709/224 |
| 8,655,726 B1* | 2/2014 | Favero | ............... | G06Q 30/0205 701/429 |
| 8,661,038 B1* | 2/2014 | Whittam | ............... | G06F 16/29 707/737 |
| 8,799,061 B1* | 8/2014 | Chatterjee | ............... | G06Q 30/0269 705/14.1 |
| 10,037,532 B2* | 7/2018 | Birukov | ............... | G06Q 20/3224 |
| 10,096,043 B2* | 10/2018 | Beck | ............... | G06Q 30/0207 |
| 2008/0244046 A1* | 10/2008 | Campbell | ............... | H04L 67/20 709/222 |
| 2015/0154641 A1* | 6/2015 | Weiss | ............... | G06Q 30/0267 455/456.3 |
| 2015/0170175 A1* | 6/2015 | Zhang | ............... | G06Q 30/0204 705/7.33 |

(Continued)

OTHER PUBLICATIONS

R. Liu, S. Buccapatnam, W. M. Gilford and A. Sheopuri, "An Unsupervised Collaborative Approach to Identifying Home and Work Locations," 2016 17th IEEE International Conference on Mobile Data Management (MDM), Porto, Portugal, 2016, pp. 310-317, doi: 10.1109/MDM.2016.53. (Year: 2016).*

*Primary Examiner* — Bruce I Ebersman
*Assistant Examiner* — Steven R Chism
(74) *Attorney, Agent, or Firm* — Ferguson Braswell Fraser Kubasta PC (57) ABSTRACT

A method is disclosed. The method includes: obtaining, from a management application, a login history including timestamps and internet protocol (IP) addresses corresponding to logins by a user; obtaining coordinates for the IP addresses; determining clusters for the coordinates based on distances between the coordinates; and determining primary locations for the user based on the clusters and the timestamps.

17 Claims, 7 Drawing Sheets

(56) References Cited

U.S. PATENT DOCUMENTS

| | | | |
|---|---|---|---|
| 2016/0125400 A1* | 5/2016 | Hu | G06Q 20/3224 |
| | | | 705/44 |
| 2016/0232150 A1* | 8/2016 | Decraene | G06F 15/00 |
| 2017/0039242 A1* | 2/2017 | Milton | G06Q 30/0269 |
| 2017/0147606 A1* | 5/2017 | Milton | G06F 16/2379 |
| 2017/0357971 A1* | 12/2017 | Pitz | H04W 12/06 |
| 2018/0204221 A1* | 7/2018 | Groarke | G06Q 30/02 |

\* cited by examiner

LOCATION DETECTION BASED ON IP ADDRESSES AND TRANSACTIONS

BACKGROUND

Determining the primary locations associated with a user (e.g., home, work, school, etc.) is important for detecting fraud against the user, for determining advertisements that should be sent to the user, for determining the user has moved or changed jobs, etc. Moreover, it may be important to determine these primary locations without directly querying the user or only querying the user to confirm the determined primary locations are correct.

SUMMARY

In general, in one aspect, one or more embodiments relate to a method. The method comprises: obtaining, from a management application, a login history comprising a plurality of timestamps and a plurality of internet protocol (IP) addresses corresponding to a plurality of logins by a user; obtaining a plurality of coordinates for the plurality of IP addresses; determining a plurality of clusters for the plurality of coordinates based on distances between the plurality of coordinates; and determining a plurality of primary locations for the user based on the plurality of clusters and the plurality of timestamps.

In general, in one aspect, one or more embodiments relate to a system. The system comprises: a computer processor; a memory coupled to the computer processor; and a plurality of instructions stored in the memory that, when executed by the computer processor, cause the computer processor to: obtain, from a management application, a login history comprising a plurality of timestamps and a plurality of internet protocol (IP) addresses corresponding to a plurality of logins by a user; obtain a plurality of coordinates for the plurality of IP addresses; determine a plurality of clusters for the plurality of coordinates based on distances between the plurality of coordinates, wherein the plurality of coordinates comprises: a first cluster comprising a first subset of the plurality of coordinates corresponding to a first subset of the plurality of timestamps; and a second cluster comprising a second subset of the plurality of coordinates corresponding to a second subset of the plurality of timestamps; and determine a plurality of primary locations for the user based on the plurality of clusters and the plurality of timestamps.

In general, in one aspect, one or more embodiments relate to a non-transitory computer readable medium (CRM) storing instructions. The instruction, when executed by a computer processor, cause the computer processor to: obtain, from a management application, a login history comprising a plurality of timestamps and a plurality of internet protocol (IP) addresses corresponding to a plurality of logins by a user; obtain a plurality of coordinates for the plurality of IP addresses; determine a plurality of clusters for the plurality of coordinates based on distances between the plurality of coordinates, wherein the plurality of coordinates comprises: a first cluster comprising a first subset of the plurality of coordinates corresponding to a first subset of the plurality of timestamps; and a second cluster comprising a second subset of the plurality of coordinates corresponding to a second subset of the plurality of timestamps; and determine a plurality of primary locations for the user based on the plurality of clusters and the plurality of timestamps.

Other aspects of the embodiments will be apparent from the following description and the appended claims.

DETAILED DESCRIPTION

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may succeed (or precede) the second element in an ordering of elements.

One or more embodiments of the invention are directed towards determining and verifying primary locations (e.g., home, work, school, etc.) associated with a user based on internet protocol (IP) addresses corresponding to logins of the user and financial transactions involving the user. Specifically, coordinates for the IP addresses are grouped into multiple clusters, and then one of the clusters is selected (e.g., based on timestamps associated with the IP addresses) as the home location of the user, while another one of the clusters is selected as the work location of the user. Further, one or more test locations for the user are determined by parsing the descriptions of financial records. These one or more test locations may be used to verify the work location and/or home location determined from the IP addresses. Moreover, once determined, these primary locations may be used in detecting fraud against the user, in selecting advertisements to be sent to the user, in determining the user has moved homes or changed jobs, etc.

Figure 1:
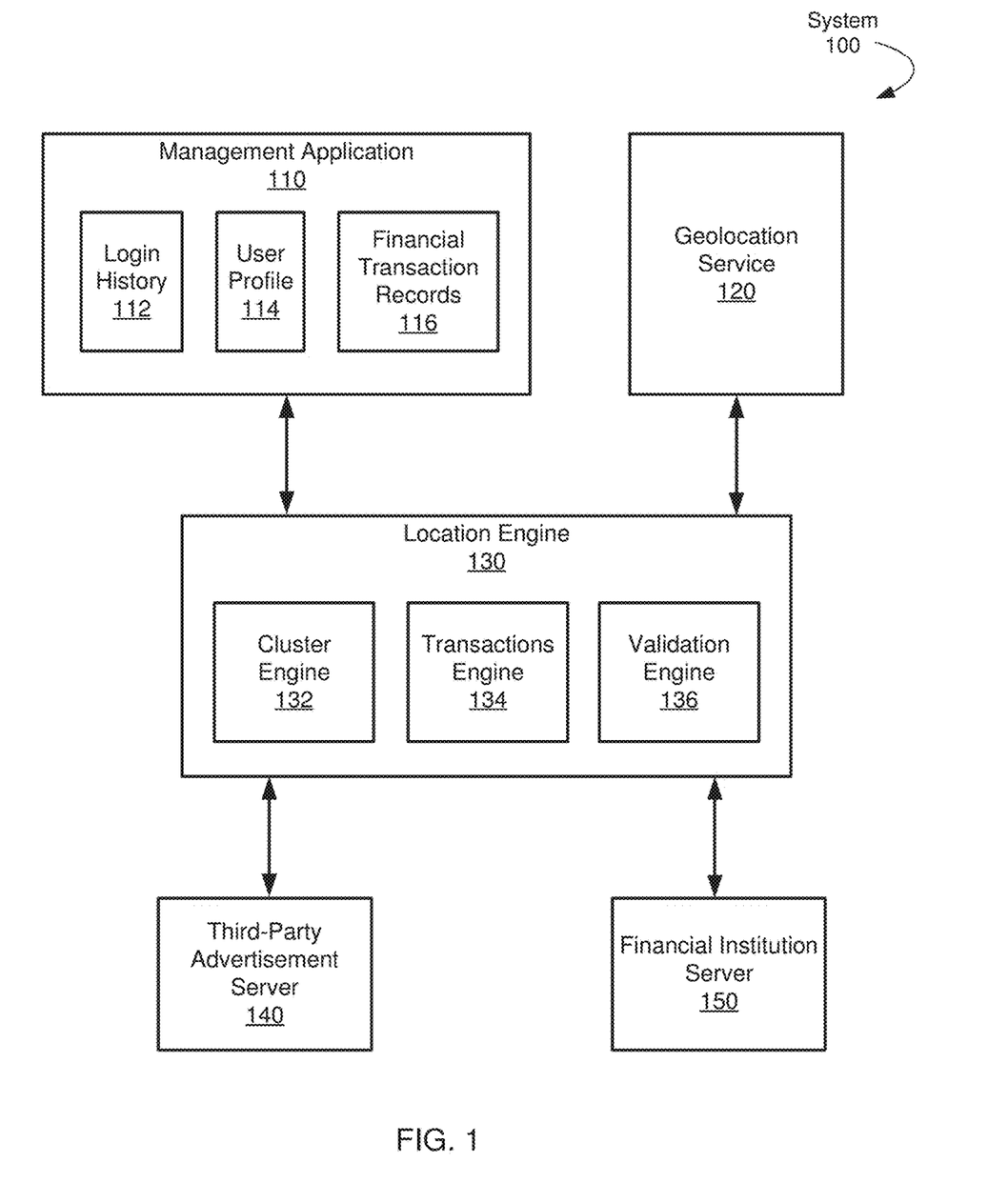
FIG. 1 shows a system in accordance with one or more embodiments of the invention.

FIG. 1 shows a system (100) in accordance with one or more embodiments of the invention. As shown in FIG. 1, the system (100) has multiple components including, for example, a management application (110), a geolocation service (120), a location engine (130), a third-party advertisement server (140), and a financial institution server (150). The management application (110), the geolocation service (120), and the location engine (130) may execute on the same computing device (e.g., server, personal computer (PC), tablet PC, smart phone, mainframe, etc.) or on different computing devices connected by one or more networks having wired and/or wireless segments.

In one or more embodiments, the management application (110) is configured to manage the finances associated with one or more users. Accordingly, the management application (110) may correspond to an accounting software application, a tax preparation software application, a personal finance software application, a payroll software application, etc.

In one or more embodiments, the management application (110) includes a login history (112) for at least one user. The login history (112) includes an IP address and a timestamp for each login to the management application by the user. Specifically, each IP address was assigned to the computing device operated by the user to access the management application (110), while the corresponding timestamp specifies the date and time of the login. The login history (112) may be in the form of a list, an array, etc.

In one or more embodiments, the management application (110) includes a profile (114) for each user. The profile (114) stores one or more attributes of a user. For example, such attributes may include the legal name of the user, the work address of the user, the home address of the user, the martial status of the user, the birthday of the user, the employer of the user, etc.

In one or more embodiments, the management application (110) includes one or more financial transaction records (116) corresponding to financial transactions involving the user (e.g., the user purchased a product or service from a merchant). Each of the financial transaction records (116) may be assigned to a category reflecting the merchant and/or the product/service purchased by the user. For example, each financial transaction may be categorized as clothing, restaurants, transportation, alcohol, furniture, gifts, groceries, automotive, parking, public transportation, financial (e.g., ATM withdrawal), etc. One or more of the financial transaction records may include a description specifying the location (e.g., one or more of state, county, city, neighborhood, suburb, zip code, postal code, etc.) of the merchant.

In one or more embodiments, the geolocation service (120) is configured to input an IP address (e.g., an IP address from the login profile (112)) and return the coordinate (e.g., latitude and longitude) corresponding to the IP address. The geolocation service (120) may also return the state, city, neighborhood, suburb, etc. corresponding to the coordinate/IP address. The geolocation service (120) may access one or more lookup tables to determine the coordinate, state, neighborhood, suburb, etc. from the IP address. Moreover, the geolocation service (120) may operate as an application programming interface (API) that can be called by another component (e.g., location engine (130)).

In one or more embodiments, the location engine (130) includes a cluster engine (132). The cluster engine (132) is configured to cluster (i.e., partition into groups) a batch of coordinates based on distances between the coordinates. The cluster engine (132) may implement a density based clustering algorithm (e.g., DBSCAN, OPTICS, DENCLUE, etc.) to execute the clustering. In one or more embodiments, the cluster engine (132) is configured to determine primary locations (e.g., home location, work location, etc.) for a user based on the clusters of coordinates, the cardinalities of the clusters, and/or timestamps corresponding to the coordinates. For example, the cluster engine (132) may compare each timestamp with a non-work hours range (i.e., a timeframe when the user is expected to be at home). For example, the non-work hours range may include 6 pm-midnight on weekdays, all day on the weekends, and/or all day on holidays, etc. In one or more embodiments, the cluster associated with the most timestamps overlapping (e.g., falling within) the non-work hours range is deemed to represent the home location of the user. In one or more embodiments, the cluster having the largest cardinality is deemed to represent the home location of the user. Each primary location (e.g., home location, work location, etc.) may be specified as one or more of state, city, neighborhood, suburb, zip code, etc. Additional details regarding operation of the cluster engine (132) are provided below in reference to FIG. 2, FIG. 3A, and FIG. 3B.

In one or more embodiments, the location engine (130) includes a transaction engine (134). The transaction engine (134) is configured to identify financial transactions in which the user was physically present (i.e., the user was near the merchant for the financial transaction) and/or the description of the financial transaction is likely to include one of the primary locations of the user. In one or more embodiments, the transaction engine (134) maintains a list of categories (e.g., ATM withdrawal, parking, public transportation, etc.) having a high probability that the user was physically present for the financial transaction and/or having a high probability that the description of a financial transaction record assigned to the category is likely to include a primary location of the user.

In one or more embodiments, the transaction engine (134) is configured to identify locations (e.g., one or more of state, city, neighborhood, suburb, zip code, postal code, etc.) from the descriptions of financial transactions. Specifically, the transaction engine (134) may parse the descriptions of the financial transaction records and compare the parsed words to known states, cities, neighborhoods, suburbs, zip codes, etc. Moreover, the transaction engine (134) may formulate one or more test locations from the parsed descriptions. For example, the location that is identified most frequently within a set of financial transaction records for a user may be designated a test location for the user.

In one or more embodiments, the location engine (130) includes the validation engine (136). The validation engine (136) is configured to verify one or more primary locations that have been determined. In one or more embodiments, the validation engine (136) compares multiple primary locations for a user with a test location (discussed above). If at least one of the determined primary locations (e.g., home location, work location, etc.) for a user matches the test location for the user, the determined primary locations are deemed valid. In contrast, if none of the determined primary locations for a user match the test location for the user, the determined primary locations are deemed invalid.

In one or more embodiments, the validation engine (136) is configured to verify the primary locations of a user with one or more known addresses of the user (e.g., home address, work address, etc.) from the profile (114) of the user. If at least one of the determined primary locations (e.g., home location, work location) for a user matches the known address for the user, the determined primary locations are deemed valid. In contrast, if none of the determined primary locations for a user match the known addresses for the user, the determined primary locations are deemed invalid.

In one or more embodiments, the validation engine (136) is configured to compare the primary locations of a user with a location of a merchant involved in a financial transaction with the user. If the distances between the location of the merchant and all primary locations of the user exceed a threshold, the validation engine (136) may issue a potential fraud alert.

In one or more embodiments, the third-party advertisement server (140) is configured to distribute location specific advertisements to users. The advertisement server (140) may utilize the determined primary locations of the users to select relevant advertisements for presentation (e.g., via email, via the US postal service, during online searching and/or shopping, etc.) to the users. For example, if one of the primary locations for a user is neighborhood X in city Y, then the third-party advertisement server (140) may present advertisements from merchants located in neighborhood X to the user. This is an improvement to at least the technical field of online targeted advertising. Specifically, the user will only be shown advertisements for merchants proximate to the user and/or merchants willing to ship products to one or more of the primary locations of the user.

In one or more embodiments, the financial institution server (150) is configured to investigate potential fraud against the user. Specifically, the financial institution server (150) may compare a location of a merchant involved in a financial transaction with a user with the primary locations of the user. If the distances between the location of the merchant and all primary locations of the user exceed a threshold, this may be an indication of fraud. Additionally or alternatively, the financial institution server (150) may submit (e.g., via an API) the location of the merchant to the location engine (130) and take action (e.g., freeze one or more accounts of the user) if a potential fraud alert is received from the location engine (130). The financial institution server (150) may belong to a bank, credit union, brokerage firm, etc. where the user has a financial account and/or that has issued the user a payment card (e.g., debit card, credit card, gift card, etc.). This is an improvement to at least the technical field of online fraud detection and mitigation. Specifically, the financial institutions that have issued payment cards to the user are able to quickly detect potential fraud involving the user's payment card and take action (e.g., freeze accounts, cancel cards, etc.) to prevent additional loss.

Figure 2:
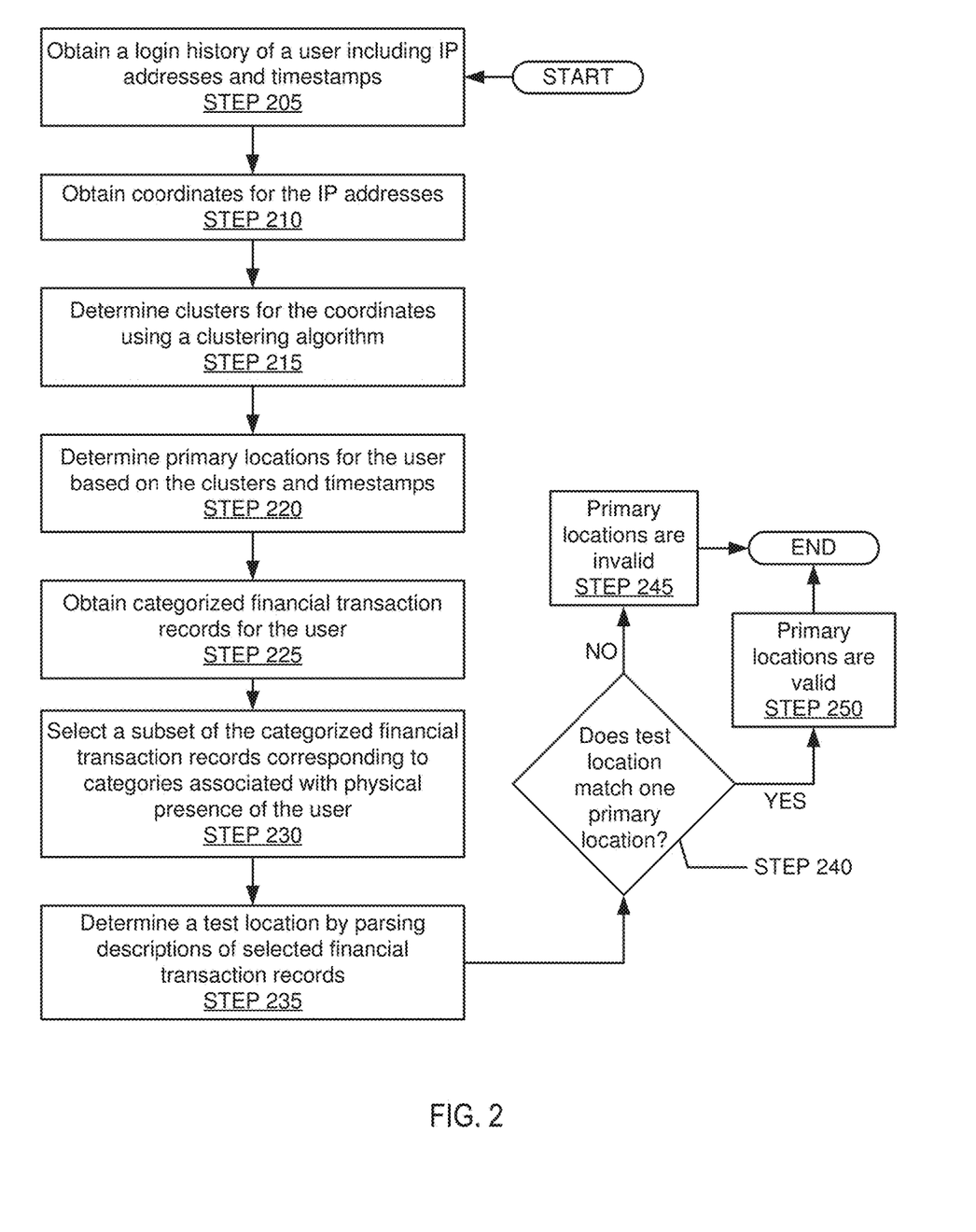
FIGS. 2, 3A, and 3B show flowcharts in accordance with one or more embodiments of the invention.

FIG. 2 shows a flowchart in accordance with one or more embodiments of the invention. The flowchart of FIG. 2 depicts a process for detecting the primary locations of a user. The process may be performed by one or more components of the location engine (130) (e.g., cluster engine (132), transactions engine (134), validation engine (136)), discussed above in reference to FIG. 1. In one or more embodiments, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, a login history of a user is obtained (STEP 205). The login history may be obtained from one or more management applications (e.g., financial account software applications, tax preparation software applications, payroll applications, etc.). The login history may be in the form of an array, a list, etc. Moreover, each entry in the login history may specify both: (i) a timestamp (e.g., date and time) denoting when the user logged into one of the management applications; and (ii) the IP address assigned to the computing device operated by the user to access the management application.

In STEP 210, coordinates (e.g., latitude and longitude) are obtained for each IP address in the login history. Obtaining the coordinates may include submitting the IP addresses from the login history to a third-party online service (e.g., geolocation service (120)). The third-party online service may utilize lookup tables to determine the coordinates based on the IP addresses. In addition to the coordinates, the third-party online service may also return one or more of the state, city, neighborhood, suburb, zip code, etc. corresponding to each IP address.

In STEP 215, the coordinates are grouped into clusters based on the distances between the coordinates. Specifically, a density-based clustering algorithm (e.g., DBSCAN, OPTICS, DENCLUE) may be used to execute the clustering. Given a set of points (e.g., coordinates), the density-based clustering algorithm groups together points that are closely packed together (points with many nearby neighbors), marking as outliers the points that lie alone in low-density regions (whose nearest neighbors are too far away). In addition to the points (e.g., coordinates) for grouping, the density-based clustering algorithm also inputs parameters. For example, in the case of the DBSCAN algorithm, the parameters include a distance (c) and the minimum number of points (minPts) required to form a dense region. Following STEP 215, there are two or more clusters of coordinates. Moreover, as each coordinate is associated with an IP address and a timestamp from the login history, each cluster is thus associated with multiple timestamps.

In STEP 220, the primary locations (e.g., home location, work location, school location, etc.) are determined based on the clusters and the timestamps associated with the clusters. Additional details regarding STEP 220 are discussed below in reference to FIG. 3A and FIG. 3B. Following STEP 220, the primary locations of the user have been determined. Moreover, each primary location may be specified as one or more of state, city, neighborhood, suburb, etc.

In STEP 225, categorized financial transaction records (e.g., categorized financial transaction records (116)) are obtained for the user. The categorized financial transaction records may be obtained from the same management application as the login history. Additionally or alternatively, one or more categorized transaction records may be obtained from a different source (e.g., a different management application). Each of the financial transaction records may have been assigned to a category reflecting the merchant and/or the product/service purchased by the user. For example, each financial transaction may be categorized as clothing, restaurants, transportation, alcohol, furniture, gifts, groceries, automotive, parking, public transportation, financial (e.g., ATM withdrawal), etc. One or more of the financial transaction records may include a description specifying the location (e.g., one or more of state, county, city, neighborhood, suburb, zip code, postal code, etc.) of the merchant.

In STEP 230, a subset of the categorized financial transaction records are selected. In one or more embodiments, in order to select the subset, each categorized financial transaction record is compared with a list of categories (e.g., ATM withdrawal, parking, public transportation, etc.) known for having a high probability that the user was physically present for the financial transaction and/or known for having a high probability that the description of a financial transaction record assigned to the category includes a primary location of the user. In one or more embodiments, a financial transaction record that is not assigned to one of the categories on the list is discarded.

In STEP 235, one or more test locations are determined. Specifically, the description of each selected financial transaction record may be parsed and the identified words may be compared with a list of known states, cities, neighborhoods, suburbs, etc. In one or more embodiments, the test location is the location (e.g., one or more of state, city, neighborhood, suburb, etc.) that appears the most frequently in the descriptions. In one or more embodiments, the test locations are the two locations that appear the most frequently in the descriptions.

In STEP 240, each test location is compared with each primary location (from STEP 220). When it is determined that at least one test location matches at least one primary location, the process proceeds to STEP 250, in which the primary locations (from STEP 220) are deemed valid. When it is determined that none of the test locations match any of the primary locations, the process proceeds to STEP 245, in which the primary locations (from STEP 220) are deemed invalid.

In one or more embodiments, STEP 245 may also include modifying the parameters of the clustering algorithm in STEP 215 and re-executing the process of FIG. 2. If a match exists during this subsequent execution (i.e., STEP 240 evaluates to "YES"), it is likely that an improved set of parameters have been identified for the clustering algorithm. Accordingly, the process of FIG. 2 may also be considered a process for selecting better parameters for a clustering algorithm and thus an improvement to at least the technical fields of machine learning and model verification.

In one or more embodiments, STEP 250 may also include comparing the primary locations (from STEP 220) with the work address and/or home address specified in the profile of the user in a management application (e.g., user profile (114)). If there is a match between one of the primary locations (from STEP 220) and at least one of the addresses from the profile, this may further validate the primary locations. If there is no match, this may be an indication that the user profile information is outdated and the user should be prompted to update the profile with current home and work addresses.

Figure 3A:
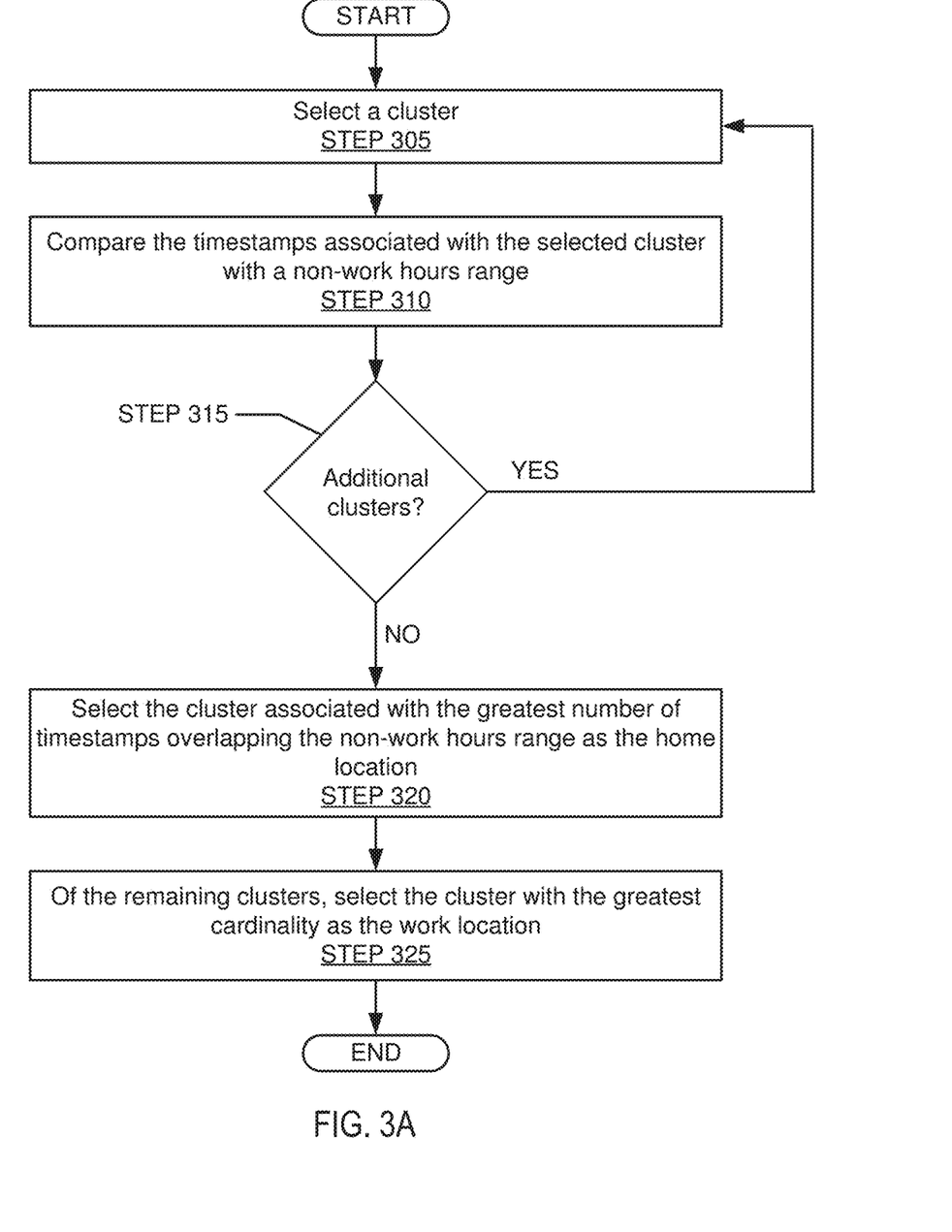

FIG. 3A shows a flowchart in accordance with one or more embodiments of the invention. The flowchart of FIG. 3A depicts a process for detecting the primary locations of the user. The process depicted in FIG. 3A may be performed by the cluster engine (132). Moreover, some or all of the steps in FIG. 3A correspond to STEP 225 in FIG. 2. In one or more embodiments, one or more of the steps shown in FIG. 3A may be omitted, repeated, and/or performed in a different order than the order shown in FIG. 3A. Accordingly, the scope of the invention should not be considered limited to the specific arrangement of steps shown in FIG. 3A.

Prior to executing STEP 305, the coordinates have been grouped into clusters (e.g., by a density based clustering algorithm). As discussed above, as each coordinate is associated with an IP address and a timestamp from the login history, each cluster is thus associated with multiple timestamps. In STEP 305, one of the clusters is selected. For example, a cluster may be selected at random. As another example, the cluster with the greatest cardinality may be selected. As yet another example, the cluster with the median cardinality may be selected.

In STEP 310, the selected cluster is compared with a non-work hours range. Specifically, it is the timestamps associated with the selected cluster that are compared with the non-work hours range. In one or more embodiments, the non-work hours range represents a timeframe when the user is expected to be at home or close to home. For example, the non-work hours range may be 6 pm-midnight Monday through Friday. Additionally or alternatively, the non-work hours range may include all day on the weekend and/or holidays. In one or more embodiments, the number of timestamps associated with the selected cluster that overlap (i.e., fall within) the non-work hours range may be counted.

In STEP 315, it is determined whether additional clusters exist that need to be compared with the non-work hours range. When it is determined that additional clusters exist, the process returns to STEP 305. When it is determined that all clusters have been compared with the non-work hours range, the process proceeds to STEP 320.

In STEP 320, the cluster associated with the greatest number of timestamps overlapping the non-work hours range is selected as the home location of the user. The state, city, neighborhood, suburb, etc. corresponding to any coordinate in the selected cluster may be utilized as the home location of the user.

In STEP 325, of the remaining clusters not selected for the home location, the cluster with the greatest cardinality is selected as the work location or school location for the user. The state, city, neighborhood, suburb, etc. corresponding to any coordinate in the selected cluster may be utilized as the work location or school location of the user. The remaining non-selected cluster(s) may be discarded.

Figure 3B:
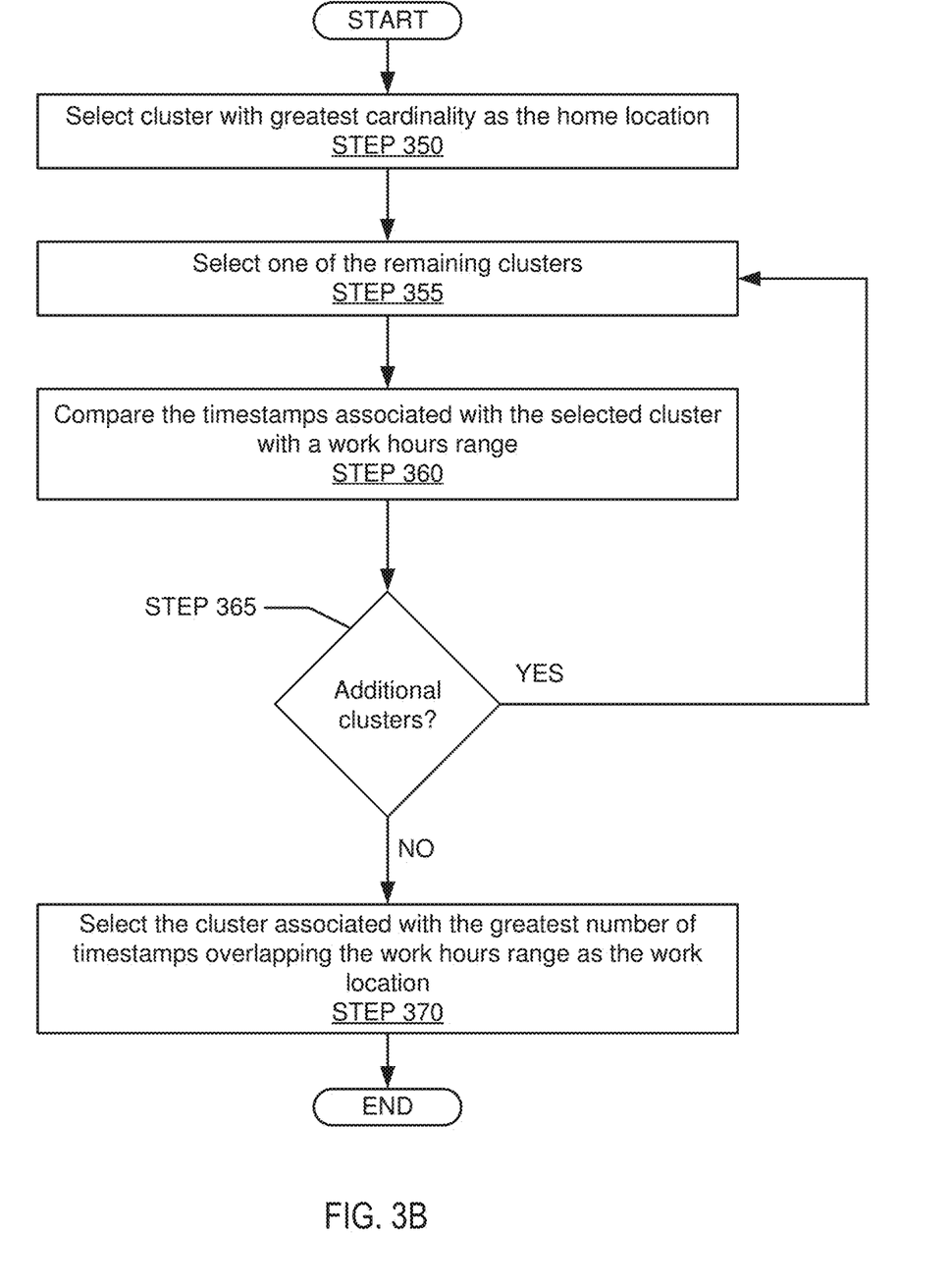

FIG. 3B shows a flowchart in accordance with one or more embodiments of the invention. The flowchart of FIG. 3B depicts a process for detecting the primary locations of the user. The process depicted in FIG. 3B may be performed by the cluster engine (132). Further, some or all of the steps in FIG. 3B correspond to STEP 225 in FIG. 2. Further still, the process depicted in FIG. 3B may be an alternative to the process depicted in FIG. 3A. In one or more embodiments, one or more of the steps shown in FIG. 3B may be omitted, repeated, and/or performed in a different order than the order shown in FIG. 3B. Accordingly, the scope of the invention should not be considered limited to the specific arrangement of steps shown in FIG. 3B.

Prior to executing STEP 350, the coordinates have been grouped into clusters (e.g., by a density based clustering algorithm). As discussed above, as each coordinate is associated with an IP address and a timestamp from the login history, each cluster is thus associated with multiple timestamps. In STEP 350, the cluster with the greatest cardinality is selected as the home location for the user. The state, city, neighborhood, suburb, etc. corresponding to any coordinate in the selected cluster may be utilized as the work location or school location of the user.

In STEP 355, one of the remaining clusters is selected. The cluster may be selected at random. Additionally or alternatively, the cluster with the median cardinality may be selected.

In STEP 360, the selected cluster is compared with a work hours range. Specifically, it is the timestamps associated with the selected cluster that are compared with the work hours range. In one or more embodiments, the work hours range represents a timeframe when the user is expected to be at work or school. For example, the work hours range may be 9 am-5 pm Monday through Friday, except holidays. In one or more embodiments, the number of timestamps associated with the selected cluster that overlap (i.e., fall within) the work hours range may be counted.

In STEP 365, it is determined whether additional clusters exist that need to be compared with the work hours range. When it is determined that additional clusters exist, the process returns to STEP 355. When it is determined that all clusters (except the cluster selected in STEP 350) have been compared with the work hours range, the process proceeds to STEP 370.

In STEP 370, the cluster associated with the greatest number of timestamps overlapping the work hours range is selected as the work location or school location of the user. The state, city, neighborhood, suburb, etc. corresponding to any coordinate in the selected cluster may be utilized as the work location or school of the user.

The following example is for explanatory purposes only and not intended to limit the scope of the invention.

Figure 4A:
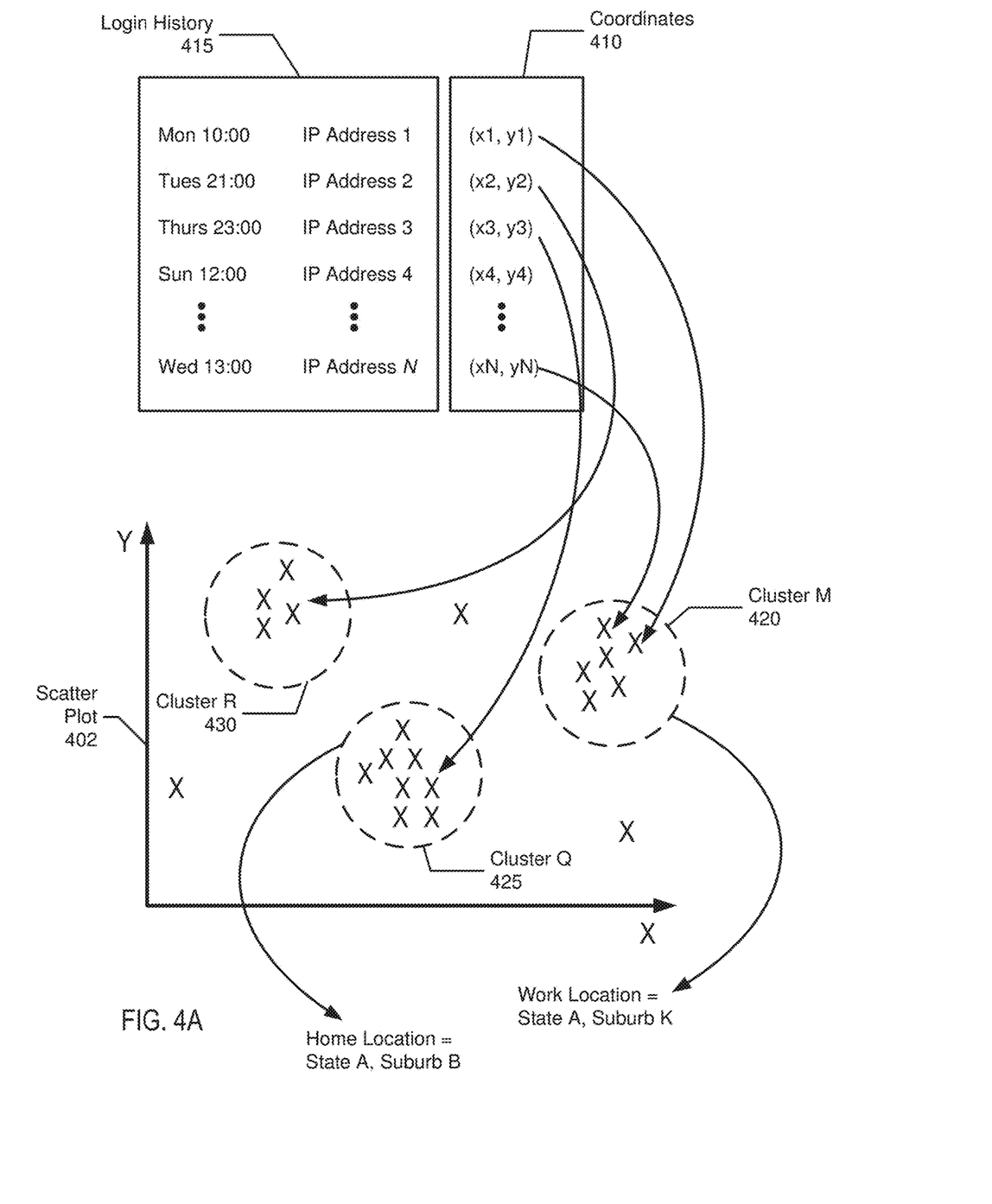
FIG. 4A and FIG. 4B show an example in accordance with one or more embodiments of the invention.
Figure 4B:
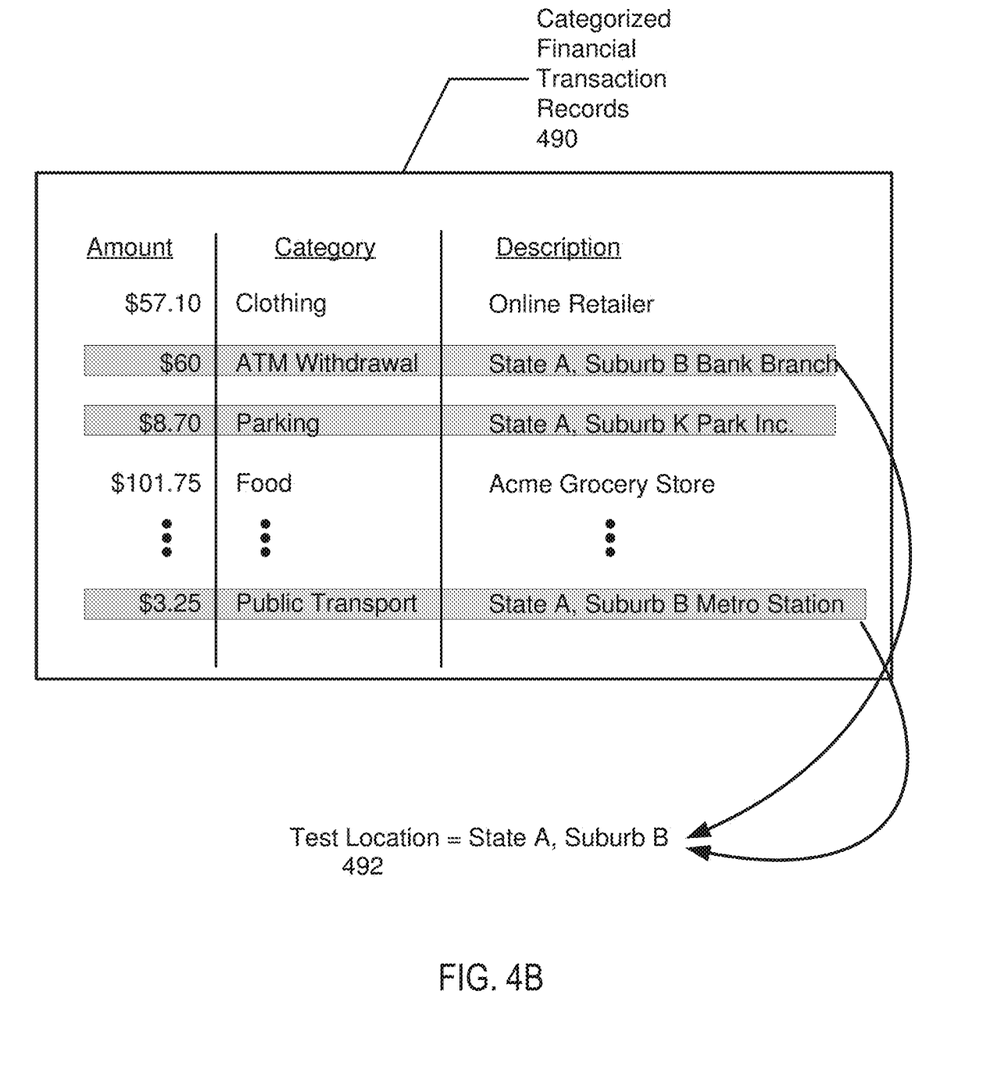

FIG. 4A and FIG. 4B show an example in accordance with one or more embodiments. FIG. 4A shows a login history (415). The login history (415) is obtained from a personal finance software application. Moreover, the login history (415) has multiple entries and each entry includes a timestamp and an IP address. For example, one entry has the timestamp "Wed 13:00" and IP Address 4. Each entry represents a login to the personal finance application by the user. Specifically, each timestamp is the time when the user logged into the personal finance application and each IP address is the IP address that was assigned to the computing device operated by the user to access the personal finance application.

FIG. 4A also shows multiple coordinates (e.g., latitude and longitude) (410). Specifically, there is one coordinate for each login event in the login history (415). Each coordinate is obtained by submitting the IP address of the login event to a geolocation service. For example, the coordinate (x3, y3) is obtained by submitting IP Address 3 to the geolocation service. Similarly, coordinate (x1, y1) is obtained by submitting IP Address 1 to the geolocation service.

FIG. 4A also shows a scatter plot (402). Each of the coordinates have been plotted on the scatter plot (402). After running the DBSCAN density-based clustering algorithm on the coordinates, three clusters are determined: Cluster M (420), Cluster Q (425), and Cluster R (430). As each coordinate is associated with an IP address and a timestamp from the login history (415), each cluster (420, 425, 430) is thus associated with a subset of the timestamps. For example, cluster M (420) is associated with at least the timestamps "Wed 13:00" and "Mon 10:00". Similarly, cluster Q (425) is associated with at least timestamp "Thurs 23:00," while cluster R (430) is associated with at least timestamp "Tues 21:00".

Assume the non-work hours range be defined as 17:00-23:59 Monday through Friday, all day Saturday, and all day Sunday. In FIG. 4A, cluster Q (425) is associated with the greatest number of timestamps that overlap (i.e., fall within) the non-work hours range. Accordingly, cluster Q (425) is selected as the home location for the user. After selecting any of the coordinates within cluster Q (425), the home location is determined as State A, Suburb B.

As for remaining cluster M (420) and remaining cluster R (430), the cardinality of cluster M (420) exceeds the cardinality of cluster R (430). Accordingly, cluster M (420) is selected as the work location for the user and cluster R (430) is discarded. After selecting any of the coordinates within cluster M (420), the work location is determined as State A, Suburb K.

FIG. 4B shows a set of categorized financial transaction records (490). The categorized financial transaction records (490) may be obtained from the same personal finance software application as the login history (415). Each record has, for example, a dollar amount, an assigned category, and a description.

In one or more embodiments, a subset of the financial transaction records (490) is selected. Specifically, the selected records are those with categories known for having a high probability that the user was physically present for the financial transaction and/or known for having a high probability that the description in a financial transaction record assigned to the category includes a primary location of the user. In FIG. 4B, the financial transaction records with the categories of ATM withdrawal, parking, and public transport are selected because these categories meet the disclosed criteria.

In one or more embodiments, a test location (492) is determined from the selected financial transaction records. Specifically, the description of each selected financial transaction record is parsed for known locations (i.e., one or more of states, cities, neighborhoods, suburbs, etc.). The test location (492) is the location that appears with the highest frequency in the descriptions of the selected financial transaction records. In FIG. 4B, the test location is State A, Suburb B.

As discussed above, the test location (492) may be used to validate the primary locations determined via the clustering. Specifically, if the test location (492) matches at least one of the primary locations, the primary locations are considered valid. The test location (492) matches the home location determined in FIG. 4A. Accordingly, the primary locations (i.e., home location, work location) determined in FIG. 4A are considered valid.

Figure 5A:
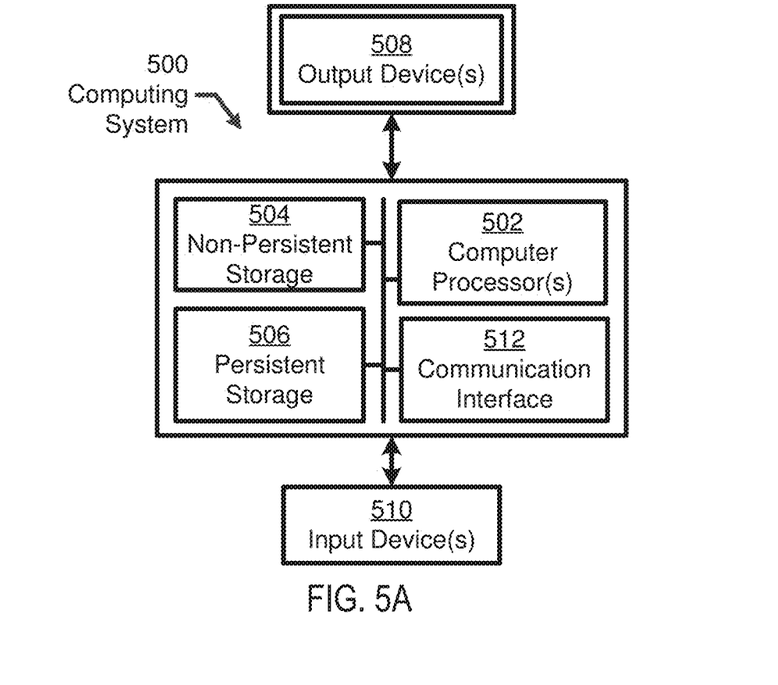
FIG. 5A and FIG. 5B show a computer system in accordance with one or more embodiments of the invention.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
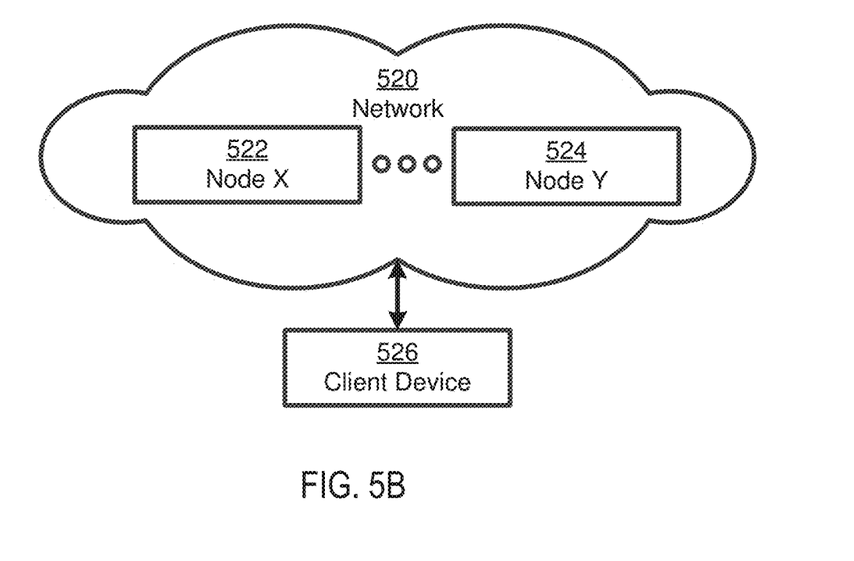

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 5A and the nodes and/or client device in FIG. 5B.

Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
    obtaining, by one or more computer processors and from a management application, a login history listing a plurality of logins to the management application by a user, the plurality of logins comprising a plurality of relationships between a plurality of timestamps and a plurality of internet protocol (IP) addresses in the login history;
    obtaining, by the one or more computer processors, for each IP address of at least a subset of IP addresses in the login history, a coordinate matching the IP address to obtain a plurality of coordinates;
    performing a clustering algorithm, by the one or more computer processors, on the plurality of coordinates to create a plurality of clusters based on distances between the plurality of coordinates;
    associating, by the one or more computer processors, the plurality of clusters with the plurality of timestamps according to the plurality of relationships in the login history;
    determining, by the one or more computer processors, a plurality of primary locations for the user based on the plurality of clusters and the plurality of timestamps, wherein determining the plurality of primary locations comprises:
        comparing, by the one or more computer processors, a first subset of the plurality of timestamps with a non-work hours range, wherein the first subset of the plurality of timestamps is for a first cluster of the plurality of clusters,
        comparing, by the one or more computer processors, a second subset of the plurality of timestamps with the non-work hours range, wherein the second subset of the plurality of timestamps is for a second cluster of the plurality of clusters,
        selecting, by the one or more computer processors, the first cluster for a home location in response to the first subset of the plurality of timestamps having more overlap with the non-work hours range than the second subset of the plurality of timestamps,
        comparing, by the one or more computer processors, a cardinality of the second cluster with a cardinality of a third cluster, of the plurality of clusters;
        discarding, by the one or more computer processors, the third cluster in response to the cardinality of the second cluster exceeding the cardinality of the third cluster; and
        selecting, by the one or more computer processors, the second cluster for a work location,
        wherein the first subset of the plurality of timestamps has more overlap with the non-work hours range than a third subset of the plurality of timestamps for the third cluster;
    obtaining, by the one or more computer processors and from the management application, a plurality of transaction records involving the user;
    parsing, by the one or more computer processors, descriptions in at least a subset of the plurality of transaction records to obtain a plurality of locations of the user, wherein the plurality of locations obtained using the subset of the plurality of transaction records is omitted from performing the clustering algorithm;
    selecting, by the one or more computer processors, a test location from the plurality of locations based on frequency of the test location in the plurality of locations;
    validating, by the one or more computer processors, the plurality of primary locations based on the test location matching a primary location in the plurality of primary locations; and
    updating, by the one or more computer processors, a user profile of the user in storage based on validating the plurality of primary locations.

2. The method of claim 1, wherein the plurality of clusters comprises:
    the first cluster comprising a first subset of the plurality of coordinates corresponding to the first subset of the plurality of timestamps; and
    the second cluster comprising a second subset of the plurality of coordinates corresponding to the second subset of the plurality of timestamps.

3. The method of claim 1, wherein the third cluster comprises a third subset of the plurality of coordinates corresponding to the third subset of the plurality of timestamps.

4. The method of claim 2, wherein determining the plurality of primary locations comprises:
    comparing, by the one or more computer processors, a cardinality of the first cluster with the cardinality of the second cluster; and
    selecting, by the one or more computer processors, the first cluster for the home location in response to the cardinality of the first cluster exceeding the cardinality of the second cluster.

5. The method of claim 1, further comprising:
    selecting, by the one or more computer processors, the at least the subset of the plurality of transaction records based on the at least the subset of transaction records corresponding to categories associated with a physical presence of the user.

6. The method of claim 1, further comprising:
    obtaining, by the one or more computer processors and from the management application, the user profile specifying an address associated with the user; and
    verifying, by the one or more computer processors, at least one of the plurality of primary locations based on the address.

7. The method of claim 1, wherein determining the plurality of clusters comprises applying the plurality of coordinates to a density based clustering algorithm.

8. The method of claim 1, further comprising:
    obtaining, by the one or more computer processors, a merchant location associated with a financial transaction involving the user;
    determining, by the one or more computer processors, a distance between the merchant location and at least one of the plurality of primary locations; and
    issuing, by the one or more computer processors and based on the distance, a potential fraud alert to a financial institution associated with the user and the financial transaction.

9. A system, comprising:
    a computer processor;
    a memory coupled to the computer processor; and a plurality of instructions stored in the memory that, when executed by the computer processor, cause the computer processor to perform operations comprising:
  obtaining, from a management application, a login history listing a plurality of logins to the management application by a user, the plurality of logins comprising a plurality of relationships between a plurality of timestamps and a plurality of internet protocol (IP) addresses in the login history,
  obtaining, for each IP address of at least a subset of IP addresses in the login history, a coordinate matching the IP address to obtain a plurality of coordinates for the plurality of IP addresses,
  performing a clustering algorithm on the plurality of coordinates to create a plurality of clusters based on distances between the plurality of coordinates,
  associating the plurality of clusters with the plurality of timestamps according to the plurality of relationships in the login history, wherein the plurality of clusters comprises:
    a first cluster comprising a first subset of the plurality of coordinates corresponding to a first subset of the plurality of timestamps, and
    a second cluster comprising a second subset of the plurality of coordinates corresponding to a second subset of the plurality of timestamps,
  determining a plurality of primary locations for the user based on the plurality of clusters and the plurality of timestamps, wherein determining the plurality of primary locations comprises:
    comparing the first subset of the plurality of timestamps with a non-work hours range,
    comparing the second subset of the plurality of timestamps with the non-work hours range,
    selecting the first cluster for a home location in response to the first subset of the plurality of timestamps having more overlap with the non-work hours range than the second subset of the plurality of timestamps,
    comparing a cardinality of the second cluster with a cardinality of a third cluster of the plurality of clusters,
    discarding the third cluster in response to the cardinality of the second cluster exceeding the cardinality of the third cluster, and
    selecting the second cluster for a work location, wherein the first subset of the plurality of timestamps has more overlap with the non-work hour range than the third subset of the plurality of timestamps for the third cluster,
  obtaining, from the management application, a plurality of transaction records involving the user,
  parsing descriptions in at least a subset of the plurality of transaction records to obtain a plurality of locations of the user, wherein the plurality of locations obtained using the subset of the plurality of transaction records is omitted from performing the clustering algorithm,
  selecting a test location from the plurality of locations based on frequency of the test location in the plurality of locations,
  validating the plurality of primary locations based on the test location matching a primary location in the plurality of primary locations, and
  updating a user profile of the user in storage based on validating the plurality of primary locations.

10. The system of claim 9, wherein the third cluster comprises a third subset of the plurality of coordinates corresponding to the third subset of the plurality of timestamps.

11. The system of claim 9, wherein the operations further comprise:
  comparing a cardinality of the first cluster with the cardinality of the second cluster; and
  selecting the first cluster for the home location in response to the cardinality of the first cluster exceeding the cardinality of the second cluster.

12. The system of claim 9, wherein the operations further comprise:
  selecting the at least the subset of the transaction records based on the at least the subset of transaction records corresponding to categories associated with a physical presence of the user.

13. The system of claim 9, wherein the operations further comprise:
  obtaining a merchant location associated with a financial transaction involving the user;
  determining a distance between the merchant location and at least one of the plurality of primary locations; and
  issuing, based on the distance, a potential fraud alert to a financial institution associated with the user and the financial transaction.

14. A non-transitory computer readable medium (CRM) storing instructions that when executed by one or more computer processors, cause the one or more computer processors to perform operations comprising:
  obtaining, by the one or more computer processors and from a management application, a login history listing a plurality of logins to the management application by a user, the plurality of logins comprising a plurality of relationships between a plurality of timestamps and a plurality of internet protocol (IP) addresses in the login history;
  obtaining, by the one or more computer processors and for each IP address of at least a subset of IP addresses in the login history, a coordinate matching the IP address to obtain a plurality of coordinates;
  performing a clustering algorithm, by the one or more computer processors, on the plurality of coordinates to create a plurality of clusters based on distances between the plurality of coordinates,
  associating, by the one or more computer processors, the plurality of clusters with the plurality of timestamps according to the plurality of relationships in the login history, wherein the plurality of clusters comprises:
    a first cluster comprising a first subset of the plurality of coordinates corresponding to a first subset of the plurality of timestamps, and
    a second cluster comprising a second subset of the plurality of coordinates corresponding to a second subset of the plurality of timestamps;
  determining, by the one or more computer processors, a plurality of primary locations for the user based on the plurality of clusters and the plurality of timestamps, wherein the determining the plurality of primary locations comprises:
    comparing, by the one or more computer processors, the first subset of the plurality of timestamps with a non-work hours range,
    comparing, by the one or more computer processors, the second subset of the plurality of timestamps with the non-work hours range, selecting, by the one or more computer processors, the first cluster for a home location in response to the first subset of the plurality of timestamps having more overlap with the non-work hours range than the second subset of the plurality of timestamps, comparing, by the one or more computer processors, a cardinality of the second cluster with a cardinality of a third cluster of the plurality of clusters, discarding, by the one or more computer processors, the third cluster in response to the cardinality of the second cluster exceeding the cardinality of the third cluster, and selecting, by the one or more computer processors, the second cluster for a work location, wherein the first subset of the plurality of timestamps has more overlap with the non-work hour range than the third subset of the plurality of timestamps for the third cluster;

obtaining, by the one or more computer processors and from the management application, a plurality of transaction records involving the user;

parsing, by the one or more computer processors, descriptions in at least a subset of the plurality of transaction records to obtain a plurality of locations of the user, wherein the plurality of locations obtained using the subset of the plurality of transaction records is omitted from performing the clustering algorithm;

selecting, by the one or more computer processors, a test location from the plurality of locations based on frequency of the test location in the plurality of locations;

validating, by the one or more computer processors, the plurality of primary locations based on the test location matching a primary location in the plurality of primary locations; and updating, by the one or more computer processors, a user profile of the user in storage based on the plurality of primary locations.

15. The non-transitory CRM of claim 14, wherein the instructions causing the one or more computer processors to determine the plurality of primary locations further cause the one or more computer processors to perform operations comprising:

comparing, by the one or more computer processors, a cardinality of the first cluster with a cardinality of the second cluster; and selecting, by the one or more computer processors, the first cluster for a home location in response to the cardinality of the first cluster exceeding the cardinality of the second cluster.

16. The non-transitory CRM of claim 14, wherein the operations further comprise:

obtaining, by the one or more computer processors, a merchant location associated with a financial transaction involving the user;

determining, by the one or more computer processors, a distance between the merchant location and at least one of the plurality of primary locations; and issuing, by the one or more computer processors and based on the distance, a potential fraud alert to a financial institution associated with the user and the financial transaction.

17. The method of claim 1, wherein parsing descriptions in at least the subset of the plurality of transaction records comprises:

extracting, by the one or more computer processors, a plurality of words from the descriptions;

comparing, by the one or more computer processors, the plurality of words to a plurality of known geographic location names to obtain a plurality of matching words; and identifying, by the one or more computer processors, the plurality of locations of the user from the plurality of matching words.

* * * * *